US008965905B2

(12) United States Patent
Ashmore et al.

(10) Patent No.: US 8,965,905 B2
(45) Date of Patent: Feb. 24, 2015

(54) DISCOVERING RELATIONSHIPS BETWEEN DATA PROCESSING ENVIRONMENT COMPONENTS

(71) Applicant: International Business Machines Corporation, Armonk, NY (US)

(72) Inventors: David A. Ashmore, Osage Beach, MO (US); Ann M. Moyer, Woodstock, NY (US); Nirmala Shobitha Nandi, Fishkill, NY (US); John Zupet, St Leonards (AU)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 13/732,631

(22) Filed: Jan. 2, 2013

(65) Prior Publication Data
US 2014/0188896 A1 Jul. 3, 2014

(51) Int. Cl.
*G06F 11/34* (2006.01)
(52) U.S. Cl.
CPC .................................... *G06F 11/34* (2013.01)
USPC .......................................................... 707/748
(58) Field of Classification Search
USPC .......................................................... 707/748
See application file for complete search history.

(56) References Cited

U.S. PATENT DOCUMENTS

| | | | |
|---|---|---|---|
| 5,765,150 A | 6/1998 | Burrows | |
| 6,101,515 A * | 8/2000 | Wical et al. | 715/234 |
| 2004/0260678 A1 | 12/2004 | Verbowski et al. | |
| 2006/0265625 A1 | 11/2006 | Dubois et al. | |
| 2014/0025702 A1 * | 1/2014 | Curtiss et al. | 707/769 |

* cited by examiner

*Primary Examiner* — Cam-Y Truong
(74) *Attorney, Agent, or Firm* — Garg Law Firm, PLLC; Rakesh Garg; Matthew Chung

(57) ABSTRACT

A method, system, and computer program product for discovering relationships between data processing environment components are provided in the illustrative embodiments. Whether a log entry in a set of log entries references a combination of the data processing environment components is detected. The combination of components includes a first component and a second component present in the data processing environment. A type of the log entry is determined. A weight is assigned to the log entry according to the determined type. the weight of the log entry is combined with a second weight of a second log entry to form a cumulative weight. A strength level for which the cumulative weight qualifies is determined. The strength level is assigned to a relationship between the combination of components.

16 Claims, 5 Drawing Sheets

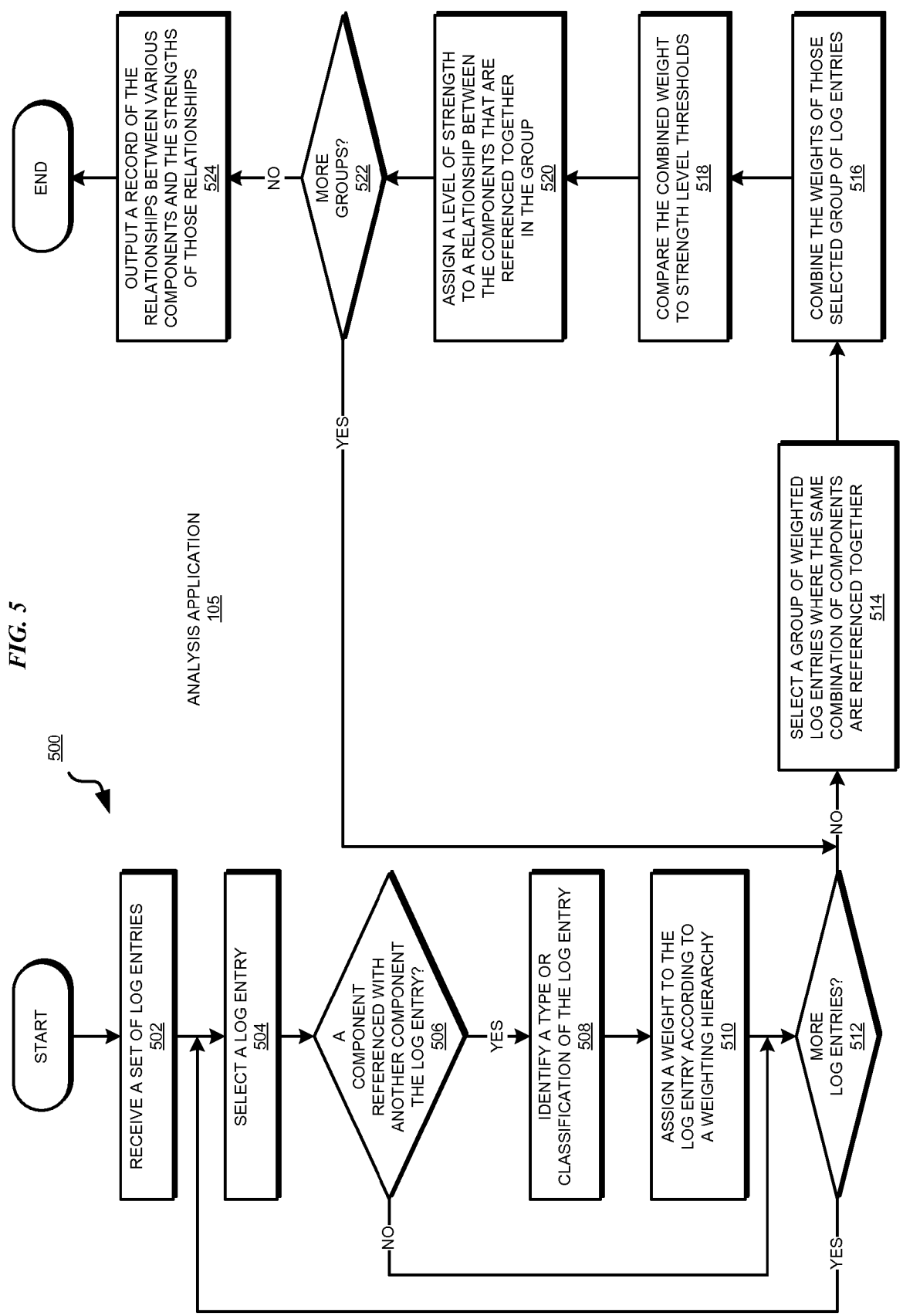

DISCOVERING RELATIONSHIPS BETWEEN DATA PROCESSING ENVIRONMENT COMPONENTS

TECHNICAL FIELD

The present invention relates generally to a method, system, and computer program product for managing a data processing environment. More particularly, the present invention relates to a method, system, and computer program product for determining relationships between data processing environment components.

BACKGROUND

Numerous components coexist in a data processing environment. The components in a data processing environment can be hardware components, software components, or a combination thereof. For example, any number of computers, data storage devices, networking equipment, server applications, business function applications, databases, client applications, virtual servers, logical partitions, and partition management firmware can be found in a typical data processing environment.

A component in a given data processing environment can depend upon any number of other components in the data processing environment for providing their intended functionalities. For example, a client application cannot function if the computer hardware executing the client application crashes. As another example, the client application may receive a timeout or failure notification if a web-server application executing on a remote server computer cannot be reached, either because the web-server application is busy, the remote server computer is experiencing an error, or a network link between the two computers is down. As another example, some applications executing in an application server depend on a database managed by a database management application executing in another server.

Complex data processing environments can include thousands if not millions of hardware, firmware, and software components. Consequently, a large number of relationships can exist between the components in such an environment. Furthermore, not all relationships are the same. For example, in one case, a component can continue to function if a related component is unavailable or delayed. In another case, a component may experience a catastrophic failure if a related component goes offline.

SUMMARY

The illustrative embodiments provide a method, system, and computer program product for discovering relationships between data processing environment components. In at least one embodiment, a method, system and program product for discovering relationships between data processing environment components are provided. A detection is made whether a log entry in a set of log entries references a combination of the data processing environment components, the combination of components including a first component and a second component present in the data processing environment. A type of the log entry is determined. A weight to the log entry is assigned according to the determined type. The weight of the log entry is combined with a second weight of a second log entry to form a cumulative weight. A strength level for which the cumulative weight qualifies is determined. The strength level is assigned to a relationship between the combination of components.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a flowchart of an example process for discovering relationships between data processing environment components, implemented in the analysis application of FIG. 3, in accordance with an illustrative embodiments.

DETAILED DESCRIPTION

Figure 1:
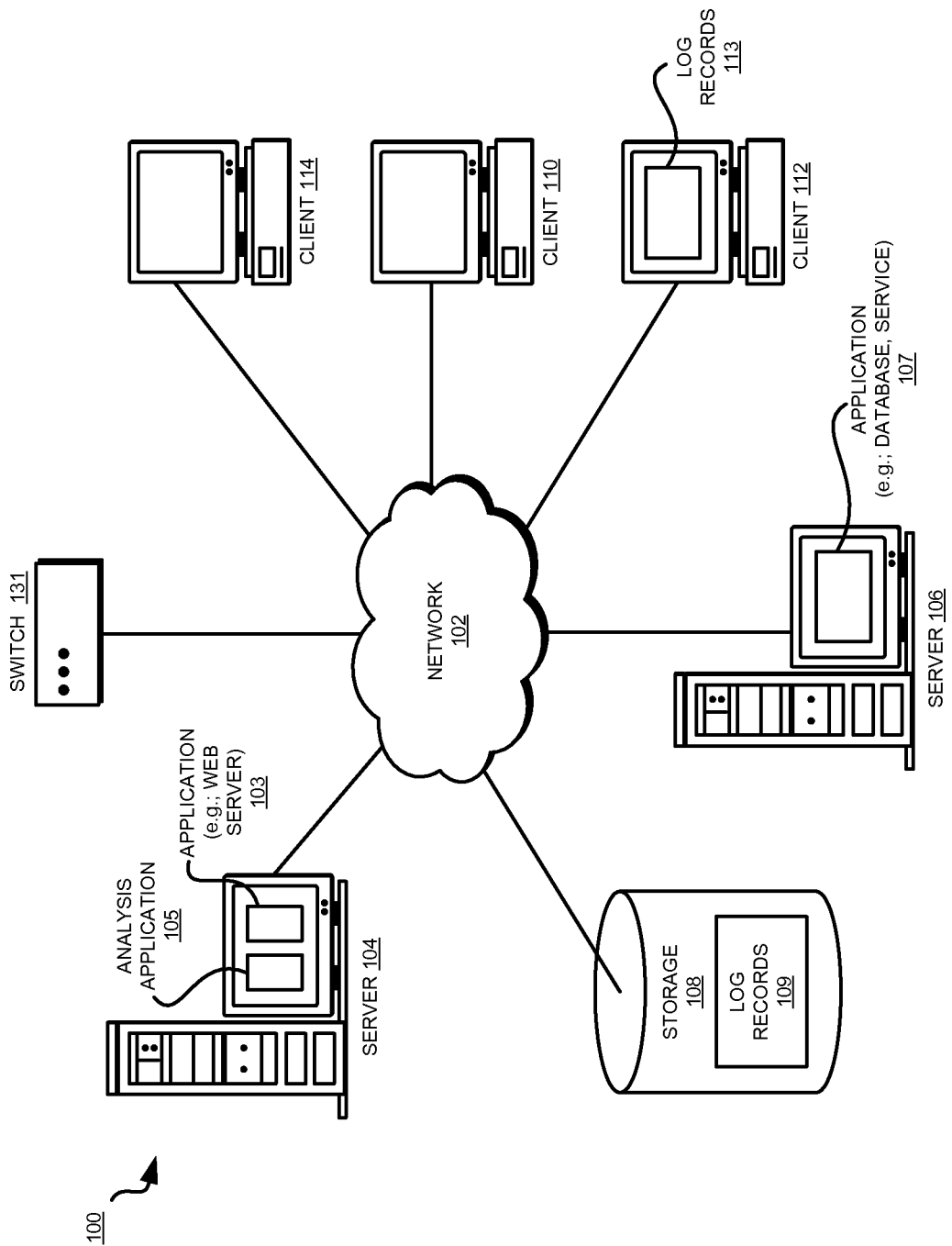
FIG. 1 depicts a pictorial representation of a network of data processing systems in which illustrative embodiments may be implemented.

The illustrative embodiments recognize that the knowledge of relationships between the components of a data processing environment is important for ensuring trouble-free operation of the environment. The illustrative embodiments further recognize that while some relationships can be identified by administrators or other users, other relationships have to be discovered in an operational environment.

For example, an administrator may specify that a client application use a particular database. However, the administrator may not know, or the information may change about which servers are used for operating that database. Consequently, when the database is operational in the given environment using particular servers, networks, and data storage devices, the relationships between the client application and the servers, networks, and data storage devices has to be discovered. Knowledge of which database application and server an application uses is important to trouble-shooting a problem with the application, i.e. whether the problem with the application is due to a failure of the database management application or the database management server.

The illustrative embodiments further recognize that changes are inevitable in an operational data processing environment. For example, a server used for operating a database may have to shut down for maintenance or upgrades, while the database workload is failed over to another server. A client application using the database has a relationship with the server used for operating the database. Consequently, when the server is changed to a failover server, the client application's relationships with the original server and the failover server also change. The failover process may affect many other relationships as well.

The illustrative embodiments recognize that relationship changes have to be managed according to the current operating conditions in the data processing environment. For example, some relationship changes may be temporary, while others may be permanent. Furthermore, a discovered change in a relationship according to a present operating condition in the data processing environment can be in conflict with the relationship as specified by a user or discovered previously.

The illustrative embodiments recognize that such changes in the relationships between data processing environment components have to be maintained to represent the current operating state of the data processing environment. Given thousands or millions of components that can be inter-related with each other, discovering the relationships and maintaining the relationships according to the operating conditions of the data processing environment is a non-trivial task. Even with manual specification of some relationships, a vast majority of relationships would not be known unless dynamically discovered in an operating data processing environment.

The illustrative embodiments used to describe the invention generally address and solve the above-described problems and other problems related to the managing component interdependencies in a data processing environment. The illustrative embodiments provide a method, system, and computer program product for discovering relationships between data processing environment components.

The illustrative embodiments provide capabilities to discover relationships between components in an operational data processing environment. An embodiment analyzes log records generated by applications, systems, events, and user activities, to discover whether two or more components are referenced together in certain log records. The embodiment infers a relationship between the components that appear together in a log record entry.

An embodiment also considers user-specified relationships between certain components in creating the record of inter-relationships between the components. An embodiment treats such specification together with other log records and updates the relationships based on the state of the data processing environment when the log records are generated.

The illustrative embodiments also recognize that a relationship between two components can have a strength associated therewith. Assume an example relationship R1 between a software component A and a hardware component B in a data processing environment, and another example relationship R2 between component A and another software component C. Under certain circumstances, component A may encounter a fatal error if component B is unavailable, but may be able to continue operation of component C is unavailable. Accordingly, an embodiment concludes that relationship R1 is a stronger relationship in comparison with relationship R2.

The strength of a relationship as determined by an embodiment can be represented in terms of any suitable terminology suitable for a given implementation. For example, in certain implementations, a component can have a "federated" type weak relationship, a "uses" type medium-strength relationship, or "depends on" type strong relationship.

As illustrated in FIG. 1, an embodiment implemented in an example automated analysis tool in an example data processing environment determines whether a component, such as a software application, depends on one or more other components, such as specific servers, network switches, storage devices or databases. The analysis tool requests the log records from database and reads various computer generated log records, such as event logs, and human generated log records, such as incident, problem and change reports. If the analysis tool finds the application name and one of the servers, network switches, storage devices or databases in the same computer generated event log entry in which the event was classified as "Fatal", "Failure" or "Warning", the analysis tool assigns a medium weight to this record. The analysis application concludes that the log record entry indicates a medium-strength relationship "Uses" between the application and the server, network switch, storage device or database that are identified in the record.

If the analysis tool finds the application name and one of the servers, network switches, storage devices or databases in a human-generated log entry in which the event was classified as "Fatal", "Error", "Outage", "Down"—such as in the case of an incident report, or "Reboot", "Failed" or "PMR"—such as in the case of a problem report), or "Upgrade", "Patch" or "Release"—such as in the case of a change report, the analysis tool assigns a low weight to this record. The analysis tool concludes that the log record entry indicates a weak relationship "Federated" between the application and the other component(s) in the record. The analysis tool makes such a distinction between event or system generated logs and human generated logs because there is increased possibility of an error or extraneous information in the human generated record.

The analysis tool combines the weights from the different computer generated record entries and human generated record entries where the same combination of components occurs. If the cumulative weight of such record entries exceeds a predetermined threshold, the analysis tool assigns a strong relationship "Depends on" between the combination of the components, indicating that if a component, such as the server, network switch, storage device or database, fails, so will another component, such as the application.

The nature or type of relationships that can be translated into a strength factor of a relationship, levels of strengths, thresholds where the levels of strengths change, and terminology to represent those relationships and strengths, as used in this disclosure are only examples, and are not intended to be limiting on the illustrative embodiments. Those of ordinary skill in the art will be able to conceive may other types, levels, thresholds, and terms for similar purpose from this disclosure and the same are contemplated within the scope of the illustrative embodiments.

The illustrative embodiments are described with respect to certain log records and entries only as examples. Such log records and entries, or their example attributes, are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
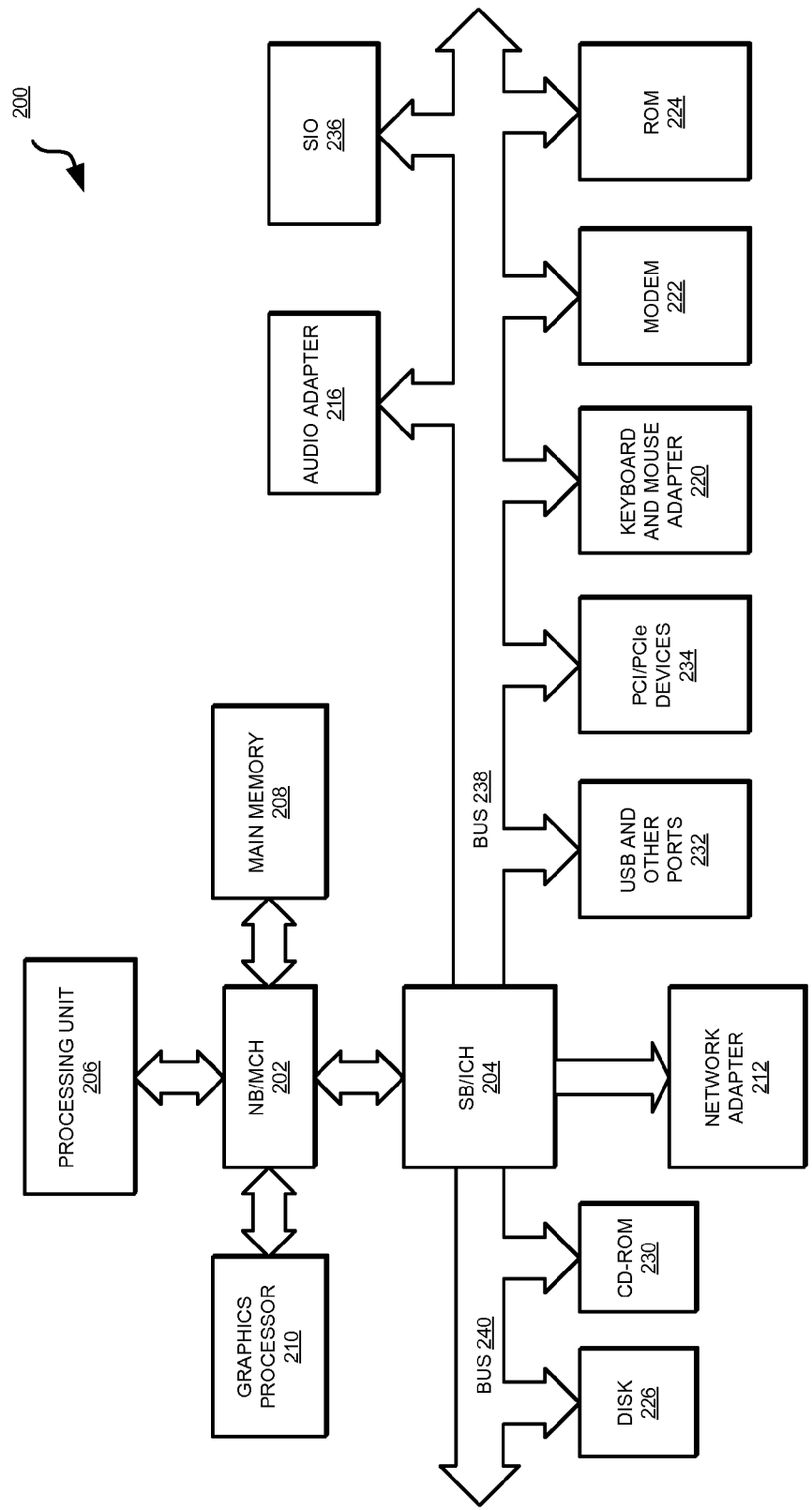
FIG. 2 depicts a block diagram of a data processing system of FIG. 1 in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114, may contain data and may have software applications or software tools executing thereon.

Only as an example, and without implying any limitation to such architecture, FIG. 1 depicts certain components that are usable in an example implementation of an embodiment. For example, switch 131 is an example networking equipment component, of which there can be any number present in a given implementation. Analysis application 105 in server 104 is an implementation of an embodiment described herein. In an example operation, application 105 identifies the relationships of application 103, which for example may be a webserver application executing in server 104. For example, analysis application 105 analyzes log records 109 in storage 108, which may be system or event-generated, log records 113 in client 112, which may be user-provided, to determine the relationships in which application 103 participates. By performing one or more operations described herein, analysis application 105 may find that application 103 is related to application 107, which may be a database or a web service, storage 108, and switch 131.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, files related to the operating system and other software applications, and applications to clients 110, 112, and 114. Clients 110, 112, and 114 may be clients to server 104 in this example. Clients 110, 112, 114, or some combination thereof, may include their own data, boot files, operating system images, files related to the operating system and other software applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. A computer readable or usable storage device does not include propagation media. Hard disk drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as analysis application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
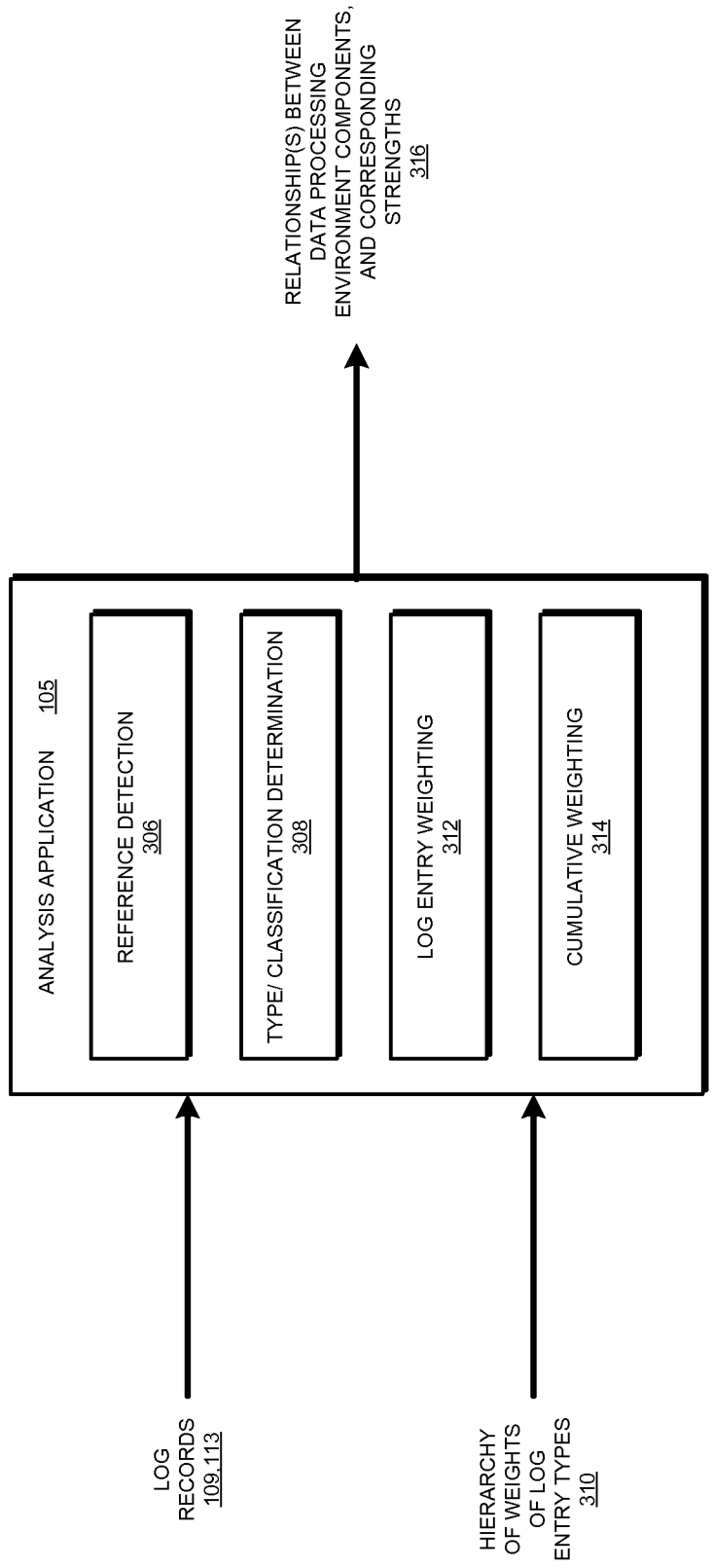
FIG. 3 depicts a block diagram of example functionality of an example analysis application of FIG. 1 for discovering relationships between data processing environment components in accordance with an illustrative embodiment.

With reference to FIG. 3, this figure depicts a block diagram of example functionality of an example analysis application for discovering relationships between data processing environment components in accordance with an illustrative embodiment. Analysis application used in this figure is an example of analysis application 105 in FIG. 1.

Analysis application 105 receives log records 109, 113 as input. Log records 109, 113 include system generated log entries, event-generated log entries, user-provided log entries, or a combination thereof.

Reference detection functionality 306 in analysis application 105 analyzes one or more log entries in log records 109, 113 to detect a reference to a data processing environment component whose relationships are to be discovered. In one embodiment, the component is specified to analysis application 105 via another input (not shown). In another embodiment, analysis application 105 identifies the component by the mention of the component in one or more log entries in log records 109, 113. Reference detection functionality 306 detects references to other components in the same log entry as the component whose relationships are to be discovered.

Type or classification determination functionality 308 determines a type of the log entry in which reference detection functionality 306 has detected the co-appearance of the component and other components. For example, the log entry may be an event-generated "Error" log entry describing an error occurring in the data processing environment. As another example, the log entry may be a system-generated "Failure" report of a subsystem failure. As another example, the log entry may be a user-generated "Change" report. As another example, the log entry may be a user-generated "Incident" report. These example types of log entries are not intended to be limiting on the illustrative embodiments. Many other types of log entries are described in this disclosure, many others will be conceivable from this disclosure by those of ordinary skill in the art, and such other types of log entries are contemplated within the scope of the illustrative embodiments.

Hierarchy 310 is a hierarchy of the various types of log entries expected in a data processing environment. Particularly, hierarchy 310 arranges a set of log entry types according to some preference such that one subset of log entry types is accorded a weight above a threshold weight value, another subset of log entry types is accorded a weight between two threshold weight values, and another subset of log entry types is accorded a weight below another threshold weight value. Any number of weight value thresholds can be defined, and accordingly any number of subsets of log entry types can be accorded relative weights in hierarchy 310 without any limitation.

Log entry weighting functionality 312 uses hierarchy 310 for determining the relative weights of the various log entries processed by functionality 308. In one embodiment, for an example log entry processed by functionality 308, functionality 312 looks up hierarchy 310 for the type identified by functionality 308, selects a weight defined for that type in hierarchy 310, and assigns that weight to the log entry.

When all or a defined portion of log records 109, 113 have been processed by functionalities 306, 308, and 312, cumulative weighting functionality 314 identifies a group of those weighted log entries that reference the same combinations of components. For example, functionalities 306, 308, and 312 may identify an "incident" log entry referencing components A and B, and having a first example weight value. Similarly, functionalities 306, 308, and 312 may identify a "failure" log entry referencing components A, B, C, and D, and having a second example weight value. Functionality 314 selects the two log entries because they both reference components A and B, and adds the first and second example weight values.

The cumulative weight value of the two example log entries in the group may be a third weight value. Operating in this manner, functionality 314 assigns a strength value to the relationship between the combination of the components co-appearing in those log entries based on the cumulative weight value of the log entries in the group. In one embodiment, the correspondence between cumulative weights and relationship strength values is also defined in hierarchy 310.

When all or a defined portion of log records 109, 113 have been processed by functionalities 306, 308, 312, and 314, analysis application 105 outputs record 316. Record 316 includes a suitable representation of the relationships existing between the components identified in log records 109, 113. Record 316 further includes strength values assigned to those relationships.

Figure 4:
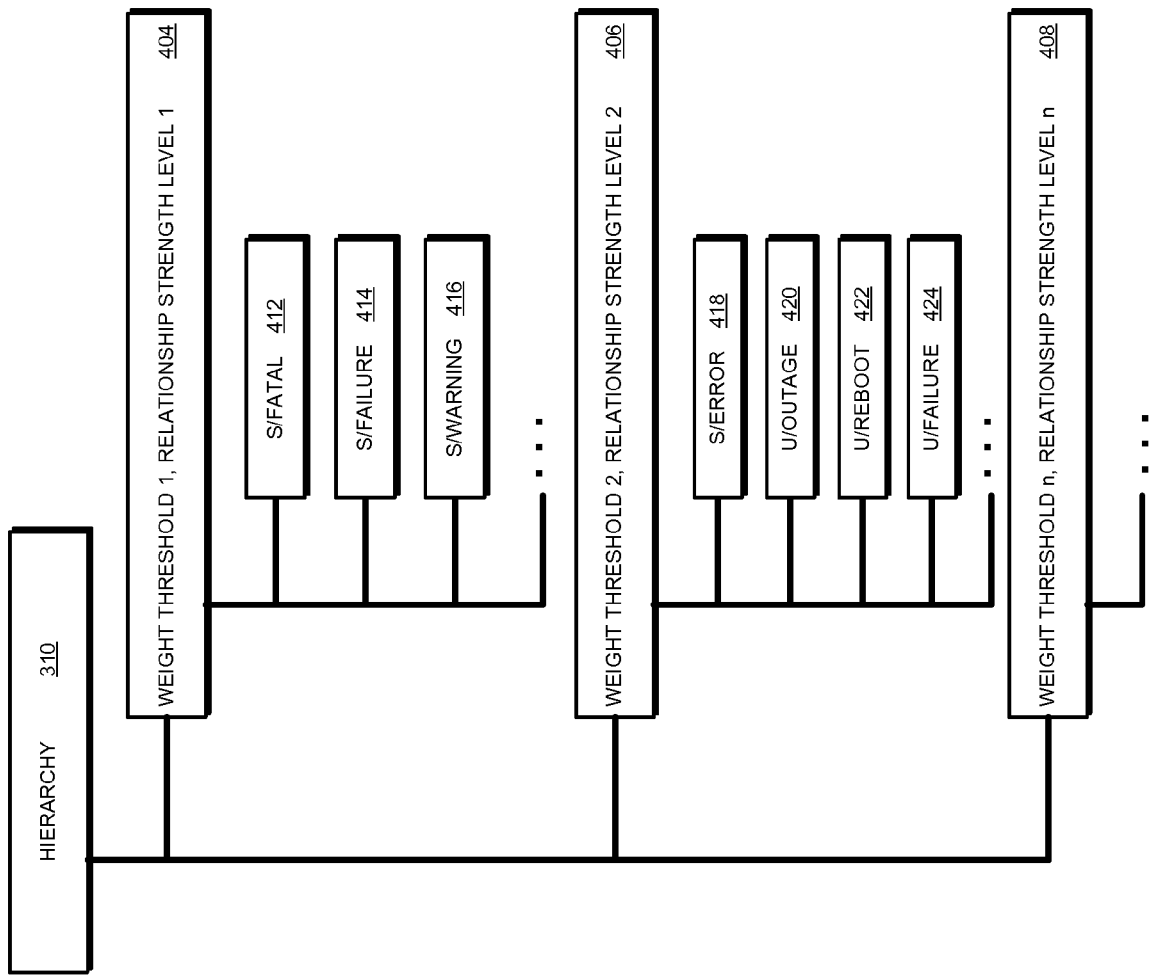
FIG. 4 depicts a hierarchy of log entry types, weights, and relationship strength values usable for discovering relationships between data processing environment components, as depicted in FIG. 3, in accordance with an illustrative embodiment.

With reference to FIG. 4, this figure depicts a hierarchy of log entry types, weights, and relationship strength values usable for discovering relationships between data processing environment components in accordance with an illustrative embodiment. Hierarchy depicted in this figure is an example of hierarchy 310 depicted and described in FIG. 3.

Hierarchy 310 defines any number of weight thresholds according to which the various types of log entries can be classified and weighted. For example, level 404 defines weight threshold 1, level 406 defines weight threshold 2, and level 408 defines weight threshold n.

Type 412 labeled "S/FATAL" corresponds to a log entry that is system-generated and pertains to a fatal error in the given data processing environment. One embodiment assigns type 412 a weight equal to weight threshold 1 of level 404. Another embodiment assigns type 412 a weight value between weight threshold 1 of level 404 and weight threshold 2 of level 406.

Similarly, type 414 labeled "S/FAILURE" corresponds to a log entry that is system-generated and pertains to a failure of a transaction or an operation in the given data processing environment. One embodiment assigns type 414 a weight equal to weight threshold 1 of level 404. Another embodiment assigns type 414 a weight value between weight threshold 1 of level 404 and weight threshold 2 of level 406, and higher or lower relative to type 412.

Similarly, type 416 labeled "S/WARNING" corresponds to a log entry that is system-generated and pertains to a warning of a condition in the given data processing environment; type 418 labeled "S/ERROR" corresponds to a log entry that is system-generated and error event in the given data processing environment; type 420 labeled "U/OUTAGE" corresponds to a log entry that is user-generated and pertains to an outage activity planned or occurring in the given data processing environment; type 422 labeled "U/REBOOT" corresponds to a log entry that is user-generated and pertains to a planned or occurring reboot activity in the given data processing environment, and type 424 labeled "U/FAILURE" corresponds to a log entry that is user-generated and pertains to a failure detected by a user in the given data processing environment. Many other types can be defined in a similar manner in hierarchy 310. Different embodiments assign weights to types 412-424 in a manner described with respect to types 412 and 414.

An embodiment uses the weight thresholds of levels 404, 406, and 408 to define relationship strengths as well. For example, an embodiment uses a factor, multiple, or other proportionality of weight threshold 1 of level 404 to correspond to relationship strength level 1. Similarly, an embodiment uses a factor, multiple, or other proportionality of weight threshold 2 of level 406 to correspond to relationship strength level 2, and a factor, multiple, or other proportionality of weight threshold n of level 408 to correspond to relationship strength level n.

Only as an example, and without implying a limitation thereto, assume that weight threshold 1 were equal to 10, weight threshold 2 were equal to 5, and weight threshold 3 were equal to 1. Further assume, only as an example, that type 412 were weighted 8, type 414 were weighted 7, type 416 were weighted 6, type 418 were weighted 5, type 420 were also weighted 5, type 422 were weighted 3, and type 424 were weighted 1.

Further assume that a relationship strength level corresponds to twice value of the corresponding weight threshold. In other words, according to the above example, relationship strength level 1 is achieved if the cumulative weight of a group of weighted log entries is between 20 and 10, relationship strength level 2 is achieved if the cumulative weight of a group of weighted log entries is between 10 and 2, and relationship strength level 3 is achieved if the cumulative weight of a group of weighted log entries is at or below 2.

Now assume that example log entry 1 is of type 412 (weight 8) and co-references components A and B, example log entry 2 is of type 414 (weight 7) and co-references components A, B, and C, example log entry 3 is of type 422 (weight 3) and co-references components B and C, and example log entry 4 is of type 424 (weight 1) and co-references components B, C, and D.

According to the above example, the cumulative weight of log entries co-referencing components A and B is 8+7=15, the cumulative weight of log entries co-referencing components B and C is 3+1=4. The cumulative weight of the log entries co-referencing components A and B falls between 20 and 10 and the cumulative weight of the log entries co-referencing components B and C falls between 10 and 2. Therefore, the strength of relationship between components A and B is at relationship strength level 1 and the strength of relationship between components B and C is at relationship strength level 2.

One embodiment may deem a relationship between components that has a strength of level 1 to be a strong relationship, a relationship between components that has a strength of level 2 to be a medium-strength relationship. The embodiment may deem a relationship between components that has a strength of level 3 to be a weak relationship The above scenario is described only as an example operation of an embodiment in an example data processing environment. The example log entries, components, weights, relationships, relationship strengths, and proportionalities described in the above illustrative example are not intended to be limiting on the illustrative embodiments.

With reference to FIG. 5, this figure depicts a flowchart of an example process for discovering relationships between data processing environment components in accordance with an illustrative embodiments. Process 500 can be implemented in analysis application 105, such as by using functionalities 306, 308, 312, and 314 in FIG. 3.

Analysis application 105 receives a set of log entries, such as log records 109, 113 in FIG. 3 (step 502). Analysis application 105 selects a log entry (step 504). Analysis application 105 determines, such as by using functionality 306, whether a component referenced in the selected log entry references another component as well (step 506).

If analysis application 105 determines that another component is co-referenced in the selected log entry ("Yes" path of step 506), analysis application 105 identifies, such as by using functionality 308, a type or classification of the selected log entry (step 508). Analysis application 105 assigns, such as by using functionality 312, a weight to the selected log entry according to a weighting hierarchy, such as hierarchy 310 in FIG. 4 (step 510).

Analysis application 105 determines whether more log entries are to be processed using steps 506, 508 and 510 (step 512). If 105 determines that another component is co-referenced in the selected log entry ("No" path of step 506), analysis application 105 proceeds to the determination o step 512 as well.

If analysis application 105 determines that more log entries are to be processed ("Yes" path of step 512), analysis application 105 returns to step 504 and selects another log entry. If analysis application 105 determines that no more log entries are to be processed ("No" path of step 512), analysis application 105 selects a group of weighted log entries where the same combination of components are referenced together (step 514).

Analysis application 105 combines, such as by using functionality 314, the weights of the weighted log entries in the selected group (step 516). Analysis application 105 compares, such as by using functionality 314, the cumulative weight of the group with one or more strength level thresholds (step 518). Analysis application 105 assigns, such as by using functionality 314 and responsive to the comparison of step 518, a level of strength of a relationship between a combination of components that is co-referenced in the group (step 520).

Analysis application 105 determines whether more groups of weighted log entries are to be selected (step 522). If analysis application 105 determines that more groups of weighted log entries are to be selected ("Yes" path of step 522), analysis application 105 returns to step 514. If analysis application 105 determines that no more groups of weighted log entries are to be selected ("No" path of step 522), analysis application 105 outputs a record of the relationships discovered between the various components referenced in the set of log entries received in step 502 (step 524). The output record of step 524 also includes the strengths of the discovered relationships. Analysis application 105 ends process 500 thereafter. In one embodiment, analysis application 105 re-executes process 500 after an interval, upon receiving an instruction, or upon detecting an event in the data processing environment.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for discovering relationships between data processing environment components. Using an embodiment, an analysis application can discover relationships that exist amongst the various combinations of the components existing in a given data processing environment during a period of operation of the data processing environment. The analysis application can also discover a strength of each such discovered relationship.

A record of the discovered relationships and their corresponding strengths is usable for augmenting, modifying, or otherwise manipulating user-specified or previously discovered relationships. The augmenting, modifying, or otherwise manipulating user-specified or previously discovered relationships is useful in ensuring that the data processing environment operates or changes in consideration of those relationships so that the disruption of the operations or services performed in the data processing environment are minimized.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for discovering relationships between data processing environment components, the method comprising:

detecting, using one or more processors, whether a log entry in a set of log entries references a combination of the data processing environment components, the combination of components including a first component and a second component present in a data processing environment, the data processing environment comprising hardware, wherein a data processing environment component provides a functionality of the data processing environment, and wherein the log entry comprises a record of an event occurring in the data processing environment;

determining, using the one or more processors, a type of the log entry;

assigning, using the one or more processors, a weight to the log entry according to the determined type;

combining, using the one or more processors, the weight of the log entry with a second weight of a second log entry to form a cumulative weight;

determining, using the one or more processors, a strength level for which the cumulative weight qualifies;

comparing the cumulative weight to at least one strength level threshold, wherein the at least one strength level threshold is specified in a hierarchy of a set of types of log entries, and wherein the hierarchy organizes the set of types of log entries according to at least one weight threshold, wherein the at least one strength level threshold is proportional to the at least one weight threshold; and assigning, using the one or more processors, the strength level to a relationship between the combination of components.

2. The method of claim 1, further comprising:

identifying, using the one or more processors, the relationship between the components referenced in the combination of components, wherein the strength level is indicative of a level of dependency between the components in the relationship; and outputting, using the one or more processors, a record of the relationship and the strength level.

3. The method of claim 1, further comprising:

grouping, using the one or more processors, the log entry and the second log entry into a group responsive to the log entry and the second log entry each referencing the combination of components.

4. The method of claim 1, further comprising:

determining, using the one or more processors, the weight using a hierarchy of a set of types of log entries, wherein the hierarchy organizes the set of types of log entries according to at least one weight threshold, wherein a first type of log entry in a first subset of the types of log entries is assigned a first weight above the at least one weight threshold, and a second type of log entry in a second subset of the types of log entries is assigned a second weight below the at least one weight threshold.

5. The method of claim 1, wherein the first component is a software application executing in the data processing environment, and the second component is a hardware component operating in the data processing environment.

6. The method of claim 1, wherein the combination of components referenced in the log entry further includes a third component.

7. The method of claim 1, further comprising:

receiving, using the one or more processors, the set of log entries; and selecting, using the one or more processors, the log entry from the set of log entries.

8. The method of claim 1, wherein one subset of the set of log entries are received in a user-provided log record, and another subset of the set of log entries is received in a system-generated log record, and wherein the system-generated log record is more reliable as compared to the user-provided log record.

9. The method of claim 1, wherein the method is embodied in a computer program product comprising one or more computer-readable storage devices and computer-readable program instructions which are stored on the one or more computer-readable storage devices and executed by the one or more processors.

10. The method of claim 1, wherein the method is embodied in a computer system comprising the one or more processors, one or more computer-readable memories, one or more computer-readable storage devices and program instructions which are stored on the one or more computer-readable storage devices for execution by the one or more processors via the one or more memories and executed by the one or more processors.

11. A computer program product for discovering relationships between data processing environment components, the computer program product comprising:
one or more computer-readable storage devices and program instructions stored on at least one of the one or more computer-readable storage devices, the program instructions comprising:
program instructions to detect, using one or more processors, whether a log entry in a set of log entries references a combination of the data processing environment components, the combination of components including a first component and a second component present in a data processing environment, the data processing environment comprising hardware, wherein a data processing environment component provides a functionality of the data processing environment, and wherein the log entry comprises a record of an event occurring in the data processing environment;
program instructions to determine, using the one or more processors, a type of the log entry;
program instructions to assign, using the one or more processors, a weight to the log entry according to the determined type;
program instructions to combine, using the one or more processors, the weight of the log entry with a second weight of a second log entry to form a cumulative weight;
program instructions to determine, using the one or more processors, a strength level for which the cumulative weight qualifies;
program instructions to compare the cumulative weight to at least one strength level threshold, wherein the at least one strength level threshold is specified in a hierarchy of a set of types of log entries, and wherein the hierarchy organizes the set of types of log entries according to at least one weight threshold, wherein the at least one strength level threshold is proportional to the at least one weight threshold; and
program instructions to assign, using the one or more processors, the strength level to a relationship between the combination of components.

12. The computer program product of claim 11, further comprising:
program instructions stored on at least one of the one or more storage devices, to identify, using the one or more processors, the relationship between the components referenced in the combination of components, wherein the strength level is indicative of a level of dependency between the components in the relationship; and
program instructions stored on at least one of the one or more storage devices, to outputting, using the one or more processors, a record of the relationship and the strength level.

13. The computer program product of claim 11, further comprising:
program instructions stored on at least one of the one or more storage devices, to group, using the one or more processors, the log entry and the second log entry into a group responsive to the log entry and the second log entry each referencing the combination of components.

14. The computer program product of claim 11, further comprising:
program instructions stored on at least one of the one or more storage devices, to determine, using the one or more processors, the weight using a hierarchy of a set of types of log entries, wherein the hierarchy organizes the set of types of log entries according to at least one weight threshold, wherein a first type of log entry in a first subset of the types of log entries is assigned a first weight above the at least one weight threshold, and a second type of log entry in a second subset of the types of log entries is assigned a second weight below the at least one weight threshold.

15. The computer program product of claim 11, wherein the first component is a software application executing in the data processing environment, and the second component is a hardware component operating in the data processing environment.

16. A computer system for discovering relationships between data processing environment components, the computer system comprising:
one or more processors, one or more computer-readable memories, one or more computer-readable storage devices, and program instructions stored on at least one of the one or more computer-readable storage devices for execution by at least one of the one or more processors via at least one of the one or more memories, the program instructions comprising:
first program instructions to detect, using the one or more processors, whether a log entry in a set of log entries references a combination of the data processing environment components, the combination of components including a first component and a second component present in a data processing environment, the data processing environment comprising hardware, wherein a data processing environment component provides a functionality of the data processing environment, and wherein the log entry comprises a record of an event occurring in the data processing environment;
second program instructions to determine, using the one or more processors, a type of the log entry;
third program instructions to assign, using the one or more processors, a weight to the log entry according to the determined type;
fourth program instructions to combine, using the one or more processors, the weight of the log entry with a second weight of a second log entry to form a cumulative weight;
fifth program instructions to determine, using the one or more processors, a strength level for which the cumulative weight qualifies;
sixth program instructions to compare the cumulative weight to at least one strength level threshold, wherein the at least one strength level threshold is specified in a hierarchy of a set of types of log entries, and wherein the hierarchy organizes the set of types of log entries according to at least one weight threshold, wherein the at least one strength level threshold is proportional to the at least one weight threshold; and seventh program instructions to assign, using the one or more processors, the strength level to a relationship between the combination of components.

* * * * *